March 28, 1950  W. A. RINGLER  2,501,852
MEANS FOR EFFECTING HERMETIC CLOSURES
IN CARTONS AND CONTAINERS
Filed May 8, 1944  2 Sheets-Sheet 1

INVENTOR.
WILLIAM A. RINGLER,
BY Allen & Allen
Attorneys

March 28, 1950     W. A. RINGLER     2,501,852
MEANS FOR EFFECTING HERMETIC CLOSURES
IN CARTONS AND CONTAINERS Filed May 8, 1944     2 Sheets-Sheet 2

WILLIAM A. RINGLER,
INVENTOR.

BY Allen & Allen
Attorneys

Patented Mar. 28, 1950

2,501,852

UNITED STATES PATENT OFFICE 2,501,852

MEANS FOR EFFECTING HERMETIC CLOSURES IN CARTONS AND CONTAINERS

William A. Ringler, Wayne, Pa., assignor to The Gardner Board and Carton Co., a corporation of Ohio Application May 8, 1944, Serial No. 534,562

6 Claims. (Cl. 229—37)

My invention relates to the problems of effecting closures by heat sealing means principally in cartons and containers where the board is directly treated with a proofing agent of thermoplastic character. Since, however, my invention is directed to the problem which arises where an extra layer of material terminates within the seam area, it will be understood that the principles of the invention are applicable to other materials than boxboard. Also, the problem of a tight closure is not restricted to the formation of hermetic seals by thermoplastic adhesives. Many cartons for substances which do not require water-proofness, grease-proofness and the like nevertheless present problems of sift-prevention and prevention of the entrance of mold spores, bacteria and insects. My invention is applicable in these fields also, and where ordinary or non-thermoplastic adhesives are employed with untreated boards.

My invention is also applicable to a wide variety of cartons and containers or a wide variety of adhesive closures therefor. A problem of tightness arises in seams or closures where board elements are adhered together either in lapped or face-to-face condition, wherever a board element forming part of the seam either on the outside or inside terminates intermediate the ends of the seam. Seams, whether formed with thermoplastic or other adhesives, are effected under pressure with or without heat. Where a board layer terminates intermediate the ends of the seam, a dangerous condition arises because of the different effective thickness of the seam at different parts. If, for example, juxtaposed walls are being adhered together in face-to-face relationship, and one of the walls has a glue lap in it, a portion of the seam will be of three thicknesses of board, while other portions of the seam will be of two thicknesses of board. Where the thicker portions of the seam ends, there is a slight relieving of pressure which may cause trouble; and where the extra layer of board terminates within the seam, ordinary pressure elements are not capable of pressing the board together just at the terminus of the glue lap. Hence, unless the quantity of adhesive present is excessive and is capable of filling the channel through the seam at this point, an hermetic seal or a tight and continuous closure, as the case may be, will not be formed.

The principal object of my invention is the solution of this problem in the way hereinafter set forth.

This and the ancillary objects of my invention, which will be set forth hereinafter or will be apparent to one skilled in the art upon reading these specifications, I attain in that structure and method of which I shall now describe certain exemplary embodiments. Reference is made to the drawings wherein.

Figure 1:
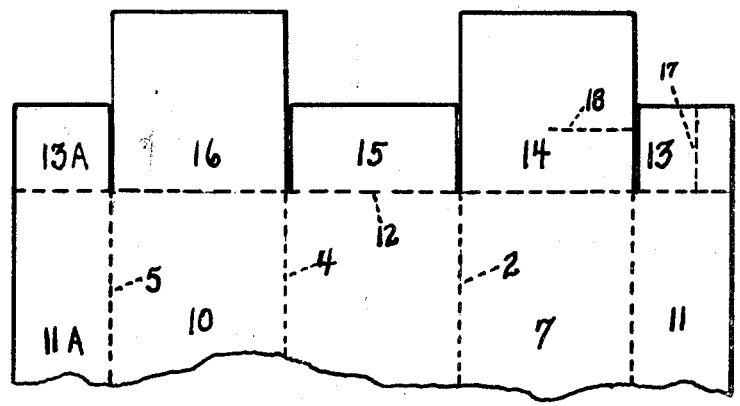
Figure 1 is a partial plan view of one type of seal end carton to which my invention has been applied.
Figure 2:
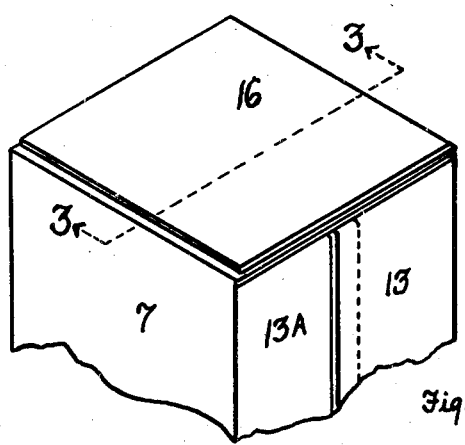
Figure 2 is a partial perspective view of the closed carton.
Figure 3:
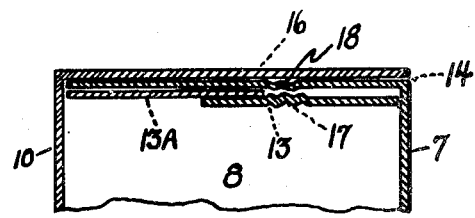
Figure 3 is a sectional and somewhat diagrammatic view taken along the line 3—3 of Figure 2.

In Figure 1 I have shown the blank for a seal end carton having longitudinal scores 1, 2, 4 and 5 demarking the blank into enclosing walls 7, 8 and 10 and two partial walls 11 and 11a, each somewhat wider than half the wall 8, so that by an ordinary tubing operation, they may be joined in a glue lap running centrally down one of the enclosing walls. An upper score line 12 has been shown setting off from the enclosing walls sealing end closures 13, 14, 15, 16 and 13a. A pair of opposite closure flaps, i. e. 15 and 13—13a, are short, while the other two closure flaps are so dimensioned as to overlie the entire end of the carton. The carton will be closed and sealed by first bending over the short flaps 15 and 13—13a, then the flap 14, and finally the flap 16, all of these flaps being adhesively secured together and the closure subjected to pressure. This will be true whether or not the board has been proofed with a thermoplastic adhesive, so that the closure will be effected under heat and pressure, or whether an air drying adhesive has been employed with pressure alone. But since walls 13 and 13a are lapped and adhesively secured, it will be seen from the sectional view, Figure 3, that a portion of the closure seam along the section line comprises four thicknesses of board, while another portion comprises only three thicknesses of board. My improvement, as applied to this carton, comprises scoring the board of portion 13, as at 17, and the board of portion 14, as at 18. The score line 17 will lie just off the edge of the glue lap, and the score line 18 will be so positioned as to coincide with score line 17 when the closure elements are in finally folded position. The score lines 17 and 18 may be single scores or they may, if desired, be a plurality of contiguous score lines. What they do is to soften the board and displace it from its normal plane, (somewhat increasing its effective thickness) off the edge of member 13a, as shown diagrammatically in Figure 3. Thus, pressure elements effective over the entire seam or progressively over portions in the seam are enabled to crush the board together just off the edge of member 13a to the extent of bringing the board surfaces very much closer together, assisting in the distribution of the adhesive present, so as to close any channels which otherwise might form, and avoiding that sharp relief of pressure which otherwise would occur at the edge of member 12a.

Figure 4:
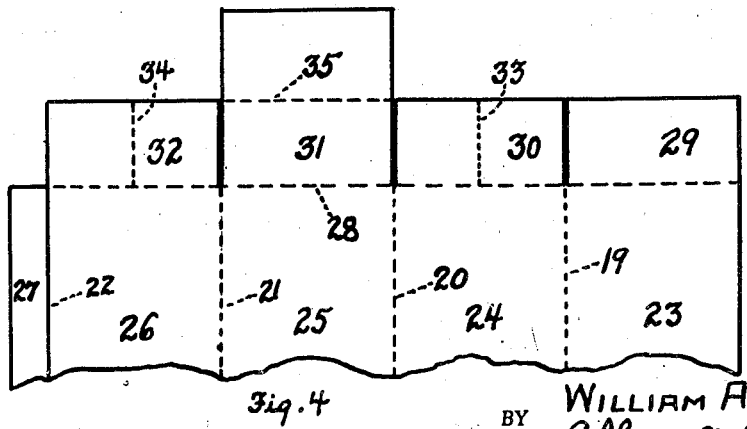
Figure 4 is a partial plan view of another type of seal end carton to which my invention has been applied.
Figure 5:
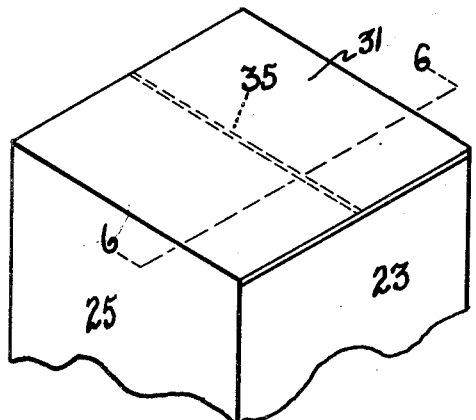
Figure 5 is a partial perspective view of this carton in closed condition.
Figure 6:
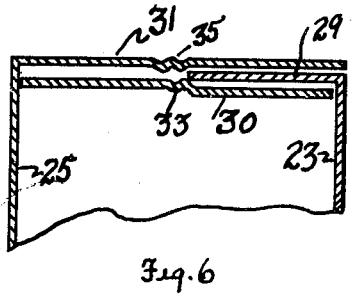
Figure 6 is a diagrammatic sectional view taken along the section line 6—6 in Figure 5.

Referring to Figure 4, the score lines 19, 20, 21 and 22 divide the blank laterally into enclosing walls 23, 24, 25 and 26, together with a glue flap 27 which, when the carton is tubed, will be adhered to wall 23. A score 28 divides the enclosing lateral walls of this carton from seal end flaps 29, 30, 31 and 32, three of which, in this instance, are short, while the fourth (31) is dimensioned to cover the entire end of the carton. In this instance, I score flaps 30 and 32, as at 33 and 34; and I score flap 31, as at 35. In this particular carton, the glue flap 27 does not extend up into the closure flaps; but the short closure flap 29 terminates intermediate the ends of flaps 30 and 32 when they are in folded-over position, as will be seen in the sectional Figure 6. The score lines 33 and 34 are, therefore, so located as to lie just off the edge of flap 29, while the score line 35 is so located as to coincide substantially with score lines 33 and 34 in the final end closure. The seam action will take place, as illustrated in Figure 6, due to the presence of the score lines, although in this instance the intermediate and terminating flap is located inside the seam. The score lines here again soften the board, increase its initial effective thickness, promote proper distribution of the adhesive, and tend to bridge the gap at the edge of flap 29.

Figure 7:
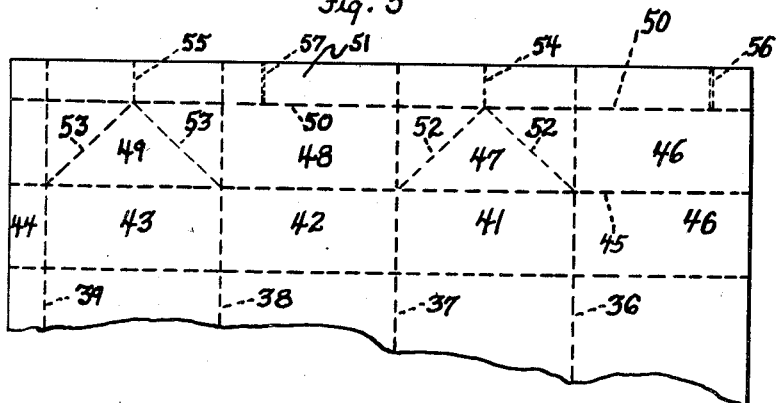
Figure 7 is a partial plan view of a blank for a carton having sealing extensions articulated to each other and so configured and scored that after closure, wall portions are juxtaposed entirely across the end of the carton in a fin.
Figure 8:
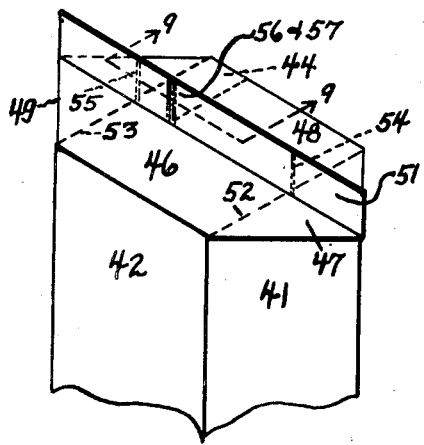
Figure 8 is a partial perspective view of a carton formed from the blank of Figure 7 in closed condition.

In Figure 7 score lines 36, 37, 38 and 39 divide the blank into enclosing lateral walls 40, 41, 42 and 43, together with a glue flap 44. A score line 45 indicates the tops of the lateral enclosing walls and demarks these walls from closure extensions 46, 47, 48 and 49. Another score line 50 demarks a fin portion 51 as a part of these extensions. Extensions 47 and 49 are provided with diagonal score lines 52 and 53 arranged as shown, and the fin has score lines 54 and 55, the arrangement being such that when the carton is closed as shown in Figure 8, extensions 46 and 48 cover the end of the carton, extensions 47 and 49 fold on their diagonal score lines to form ears, and the board walls all across the end of the carton are juxtaposed in the upstanding fin 51. This fin is used for sealing, the board either being treated with a thermoplastic adhesive substance or having adhesive applied to it within the fin portion.

Figure 9:
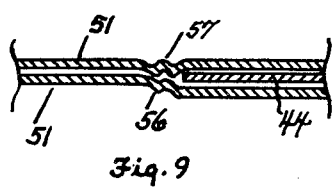
Figure 9 is a diagrammatic sectional view through the fin taken along the section line 9—9 of Figure 8.

But it will be noted that the glue flap 44 is continuous across the end of the blank and, therefore, is caught in the seam in the fin 51. In this carton my improvement consists in the formation of score lines, as at 56 and 57, so located that these score lines will come together in the fin 51 and will lie just off the edge of the glue flap 44. Here again, as in the other instances I have described, the scores 56 and 57 may be single scores or double scores, or multiple scores as desired, the choice being in part dependent upon the thickness of the board walls. In some instances where, as in Figures 6 and 9, a board element terminates within a seam, it is sufficient merely to score one of the board walls rather than both, as I have shown. This again is determined largely by the thickness of the board. But in all of these instances, the single or multiple scoring of the board softens it, increases its thickness, makes it easier to compress into a surface-conformed condition, and (when pressure elements are applied), tends to even up the pressure instead of permitting a sharp drop in it at the cut edge of the glue flap or other included element. Again, as I have explained, the adhesive is better distributed and becomes more effective in producing a tight closure.

I have shown my invention applied to three typical forms of sealed cartons and in the light of these teachings, it will now be clear to the skilled worker in the art how the principles of my invention may be applied to other types of cartons presenting similar problems. Hence, the particular cartons shown do not form limitations upon my invention, and the particular cross-sectional shape of the cartons shown is likewise inconsequential. Modifications may be made in my invention without departing from the spirit of it. Having thus described my invention, what I claim as new and desire to secure by Letters Patent is:

1. In a seam construction in a carton or like container, juxtaposed board faces consisting of at least two board elements coextensive throughout the seam and another board element not coextensive but terminating within the ends of the seam, a scored condition of the first mentioned two of said elements adjacent and substantially parallel to the termination of the third, said scored elements being displaced from their normal planes along the lines of score the effective thickness of the board being increased thereby, and the board being softened, the softened board being so compressed as more perfectly to bridge the gap at the terminus of said third member.

2. In a carton or similar container a seam formed adhesively between two juxtapositioned wall portions, a third wall portion of lesser extent than the said seam, forming a part thereof but terminating inwardly of the ends of said seam, the material of at least one of the first mentioned wall portions being scored adjacent and substantially parallel to the end of said third wall portion, whereby to increase the effective thickness of the said material and to promote the surface conformation of the seam parts under pressure, said wall portions being displaced from their normal planes along the lines of score.

3. The structure claimed in claim 2 wherein the third portion is located on the outside of the said seam.

4. The structure claimed in claim 2 wherein the said third portion is located within the seam structure, and for a part of their extent, lies between the first mentioned wall portions.

5. The structure claimed in claim 2 wherein the said third portion is located within the seam structure, and for a part of their extent, lies between the first mentioned wall portions, and in which both of the first mentioned wall portions are scored as set forth.

6. The structure claimed in claim 2 wherein the said third portion is located within the seam structure, and for a part of their extent, lies between the first mentioned wall portions, and in which both of the first mentioned wall portions are scored as set forth, the seam being effected by means of a thermoplastic adhesive.

WILLIAM A. RINGLER.

REFERENCES CITED

The following references are of record in the file of this patent:

UNITED STATES PATENTS

| Number | Name | Date |
| --- | --- | --- |
| 1,394,590 | Weis | Oct. 25, 1921 |
| 1,847,834 | Iacobitti | Mar. 1, 1932 |
| 1,932,197 | Sutherland | Oct. 24, 1933 |
| 1,946,554 | Sutherland | Feb. 13, 1934 |
| 2,206,406 | Koch | July 2, 1940 |
| 2,322,654 | Moore | June 22, 1943 |
| 2,324,757 | Botley | July 20, 1943 |
| 2,350,312 | Hatch | May 30, 1944 |